J. GOETZ, W. K. BUXBAUM & F. A. PARSONS.
LUBRICATING SYSTEM FOR MILLING MACHINE KNEES.
APPLICATION FILED NOV. 13, 1913.
1,087,365.
Patented Feb. 17, 1914.
2 SHEETS—SHEET 1.
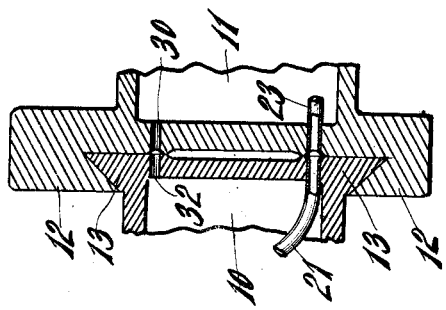
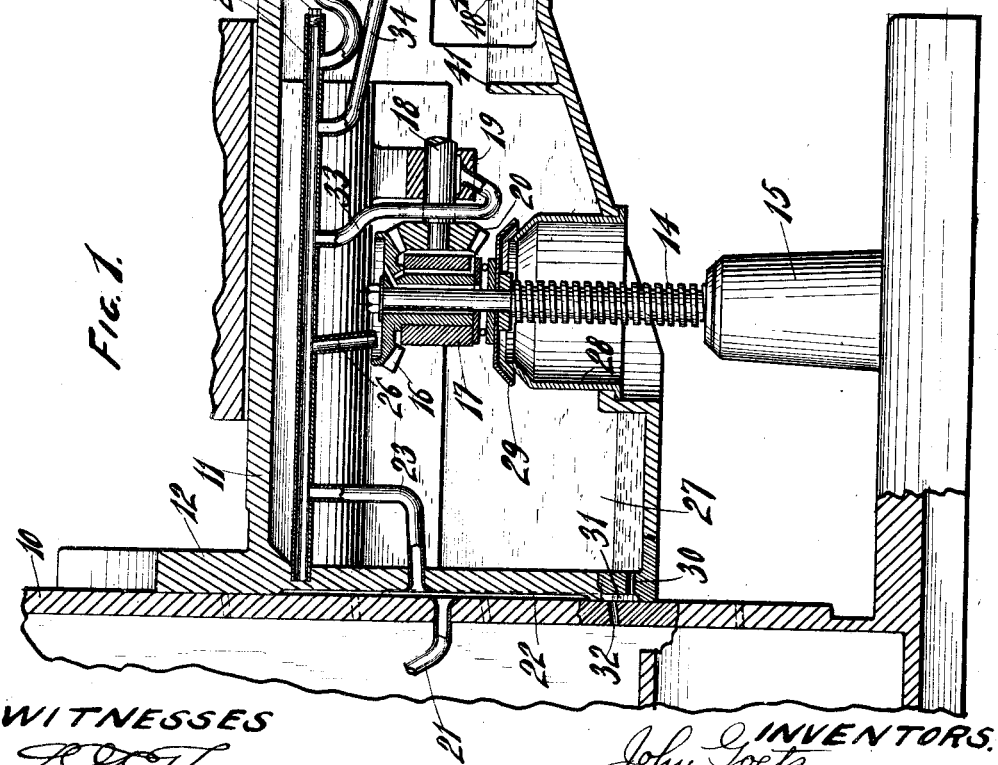
WITNESSES
INVENTORS.
John Goetz,
William K. Buxbaum,
Fred A. Parsons,
By Morsell & Caldwell
ATTORNEYS.

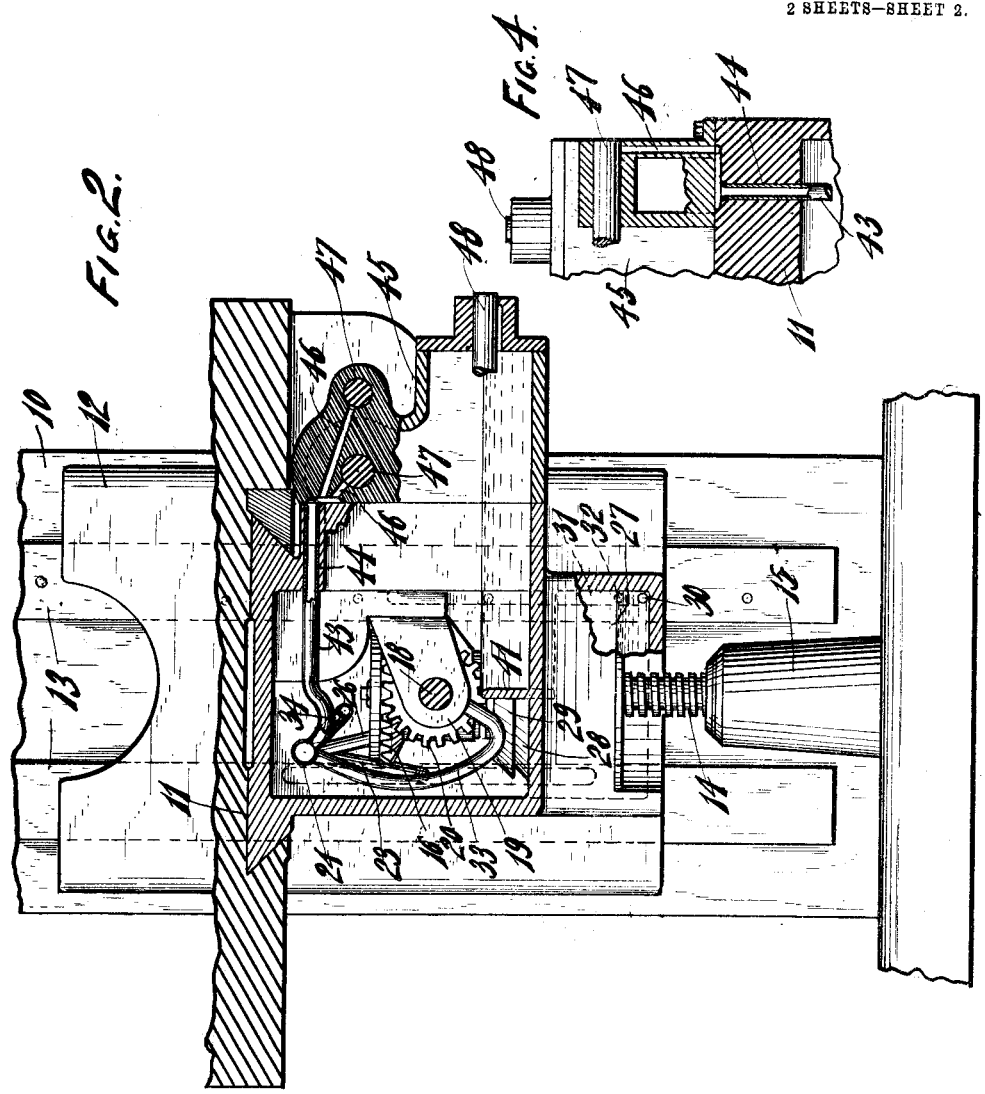

UNITED STATES PATENT OFFICE.

JOHN GOETZ, OF WEST ALLIS, AND WILLIAM K. BUXBAUM AND FRED A. PARSONS, OF MILWAUKEE, WISCONSIN.

LUBRICATING SYSTEM FOR MILLING-MACHINE KNEES.

1,087,365.   Specification of Letters Patent.   Patented Feb. 17, 1914.

Application filed November 13, 1913. Serial No. 800,729.

*To all whom it may concern:*

Be it known that we, JOHN GOETZ, a citizen of the United States, and resident of West Allis, in the county of Milwaukee and State of Wisconsin, and WILLIAM K. BUXBAUM and FRED A. PARSONS, citizens of the United States, and residents of Milwaukee, in the county of Milwaukee and State of Wisconsin, have invented new and useful Improvements in Lubricating Systems for Milling-Machine Knees, of which the following is a description, reference being had to the accompanying drawings, which are a part of this specification.

This invention has for its object to provide a lubricating system for supplying lubricant under pressure to the various operating parts carried by the vertically adjustable knee of a milling machine and for the return of lubricant to the casing of the milling machine, which system will be unaffected by the adjustment of the knee member on the casing of the milling machine.

With the above and other objects in view the invention consists in the lubricating system for milling machine knees as herein claimed and all equivalents.

Referring to the accompanying drawings in which like characters of reference indicate the same parts in different views, Figure 1 is a longitudinal vertical sectional view of a milling machine knee provided with a lubricating system constructed in accordance with this invention; Fig. 2 is a similar view on a plane at right angles to the sectional plane of Fig. 1; Fig. 3 is a sectional plan view of the adjustable sliding connection between the knee and the casing of the milling machine; and, Fig. 4 is a detail sectional view of the lubricant passageway to the gear box.

In these drawings 10 indicates a milling machine casing of ordinary construction and 11 is the hollow knee member which is vertically adjustable thereon by having undercut flanges 12 slidably fitting upon dovetail bearing flanges 13 of the casing. The vertical adjustments of the knee are accomplished by the turning of a jackscrew 14 which is threaded in a stationary nut 15 at its lower end and has keyed to it a beveled gear wheel 16 at its upper end. The beveled gear 16 forms a bearing between the jackscrew and the knee by having its cylindrical sleeve-like portion fitting within a vertical bearing bracket 17 forming a part of the knee construction. The jackscrew 14 is turned by means of a shaft 18 journaled in another bearing bracket 19 of the knee construction and carrying a beveled pinion 20 on its end meshing with the beveled gear 16.

A lubricant supply pipe 21 leading from any suitable source of lubricant supply under pressure within the casing of the milling machine terminates at the bearing surface of one of the flanges of the casing and a vertical groove 22 in the bearing surface of the knee member registers with the end of the lubricant supply pipe during all vertical adjustments of the knee, while a feed pipe 23 communicates with said groove and delivers the oil to a horizontal header pipe 24 secured within the upper part of the knee, preferably by having one end embedded in the end of the knee as shown, and its other end closed by a screw plug 25. A feed tube 26 leads from the header pipe 24 to the dish-shaped upper portion of the beveled gear 16 from which a passageway leads to the bearing surface of the bearing bracket 17 while overflow from the beveled gear 16 will serve to lubricate the intermeshing teeth of the said gear and its driving pinion 20, the surplus falling to the bottom of the interior of the knee which forms a chamber 27 therefor. A cylindrical guard 28 prevents the outlet of the lubricant through the opening in the bottom of the knee through which the jackscrew passes and an overhanging shield 29 prevents the drip of lubricant into the interior of the guard 28. The lubricant in the chamber 27, however, is free to discharge in all positions, the portion forming the upper section at the bottom of the chamber leaning to a vertical groove 31 in the bearing surface of the knee which registers with a series of openings 32 through the wall of the milling machine casing at different elevations. Thus the lubricant is returned from the knee to the casing from which it was taken. Another feed tube 33 leads from the header pipe 24 to the bottom of bearing 19 for the shaft 18 which turns the jackscrew for raising and lowering the knee, while a feed tube 34 leads from the header pipe 24 to the bottom of a bearing 35 at the end of the knee for a shaft 36 which carries a pinion 37 meshing with a pinion 38, the latter in turn meshing with a pinion 39 on a shaft 40 passing through the end wall of the knee. The overflow of oil fed to the bearing 36 through the feed tube 34 serves to lubricate this train of gearing, and furthermore a dam 41 formed at the bottom of the knee at this end serves to confine such oil until it reaches a level which will permit it to enter a central opening 42 in the shaft 40 which leads to its bearing surface to lubricate the same. Another feed tube 43 leads from the header pipe 24 to an opening 44 in the side wall of the knee extending to the bearing surface of a gear casing 45 which is secured to the knee and forms a continuation of the lubricant well in which the oil is held by the dam 41. Passageways 46 in the end wall of the gear casing 45 leads to bearings for shafts 47 which are journaled in the gear casing to supply lubricant to such bearings.

In operation the lubricant supply under pressure maintains its communication with the header pipe within the knee in all positions of the knee and this supply of lubricant is distributed through the feed tubes to the various bearing surfaces, the surplus oil dripping from the bearing surfaces falling into the chamber 27 from which it returns through the openings 30 and 32 to the casing of the milling machine, enough of the oil being retained by the dam 41 to lubricate shaft 40 and a shaft 48 which is journaled on the same level therewith in the gear casing.

What we claim as new and desire to secure by Letters Patent is:

1. In a milling machine, a lubricating system for the knee thereof comprising a lubricant supply pipe delivering lubricant under pressure to the bearing surface of the casing, a feed pipe in the knee having communication with the lubricant supply pipe in different positions of the knee, a header pipe within the knee connected with the feed pipe, and a feed tube leading from the header pipe to deliver lubricant to the bearing of the jackscrew for adjusting the knee.

2. In a milling machine having an adjustable knee with a jackscrew for moving the knee and a beveled gear on the jackscrew for turning the same, a shaft journaled in the knee, a beveled pinion thereon meshing with the beveled gear, said beveled gear being dish-shaped at its upper end with a lubricant passageway leading therefrom to the bearing of the jackscrew, a lubricant supply pipe delivering lubricant to the knee bearing surface on the milling machine casing, a feed pipe in the knee having communication with the lubricant supply pipe in different positions of the knee, a header pipe within the knee connected with the feed pipe, and feed tubes leading from the header pipe to the dish-shaped upper end of the beveled gear and to the bearing of the said shaft.

3. In a milling machine having an adjustable knee and a gear casing secured to the side of the knee with shafts journaled in the knee and the gear casing, a lubricant supply pipe leading to the knee bearing surface on the milling machine casing, a feed pipe in the knee having communication with the lubricant supply pipe in different positions of the knee, a header pipe connected with the feed pipe, feed tubes leading from the header pipe to the bearings of the shafts in the knee and the gear casing, a shaft journaled in the knee having a central passageway leading to its bearing, and a dam within the knee for retaining oil within the knee to the level of said passageway.

4. In a milling machine having an adjustable knee and a gear casing secured to the side of the knee with shafts journaled in the knee and the gear casing, a lubricant supply pipe leading to the knee bearing surface on the milling machine casing, a feed pipe in the knee having communication with the lubricant supply pipe in different positions of the knee, a header pipe connected with the feed pipe, and feed tubes leading from the header pipe to the bearings of the shafts in the knee and the gear casing.

5. In a milling machine having an adjustable knee with a jackscrew for moving the knee and a beveled gear on the jackscrew for turning the same, a shaft journaled in the knee, a beveled pinion thereon meshing with the beveled gear, said beveled gear being dish-shaped at its upper end with a lubricant passageway leading therefrom to the bearing of the jackscrew, a lubricant supply pipe delivering lubricant to the knee bearing surface of the milling machine casing, a feed pipe in the knee having communication with the lubricant supply pipe in different positions of the knee, a header pipe within the knee connected with the feed pipe, feed tubes leading from the header pipe to the dish-shaped upper end of the beveled gear and to the bearing of the said shaft, a gear casing secured to the side of the knee and communicating with the interior thereof, shafts journaled in the knee and the gear casing, feed tubes leading from the header pipe to the bearings of said shaft in the knee and the gear casing, another shaft journaled in the end of the knee and having a central passageway leading to its bearing, a dam within the knee for holding the lubricant overflow from the supply through the last mentioned feed tubes to the level of the central passageway in the last mentioned shaft, and means for returning lubricant from the knee to the casing of the milling machine.

In testimony whereof, we affix our signatures, in presence of two witnesses.

JOHN GOETZ.
WILLIAM K. BUXBAUM.
FRED A. PARSONS.

Witnesses:
C. H. KEENEY,
EMILY SCHOWALTER.